J. A. BILTERMAN.
NUT LOCK.
APPLICATION FILED FEB. 26, 1921.

1,409,817.

Patented Mar. 14, 1922.
2 SHEETS—SHEET 1.

John A. Bilterman,
INVENTOR

BY Victor J. Evans
ATTORNEY

WITNESS:

J. A. BILTERMAN.
NUT LOCK.
APPLICATION FILED FEB. 26, 1921.
1,409,817.
Patented Mar. 14, 1922.
2 SHEETS—SHEET 2.
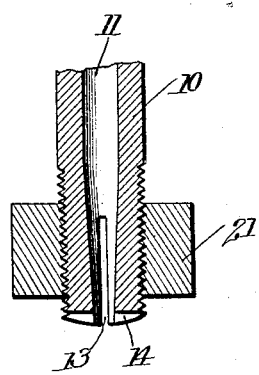
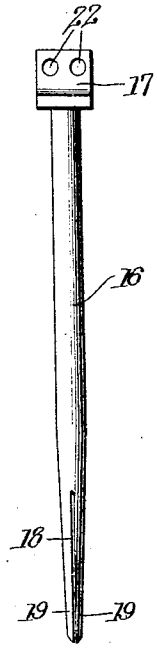
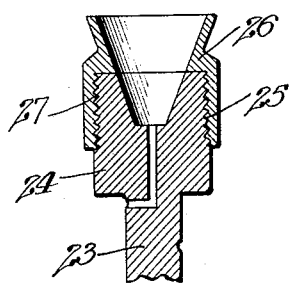
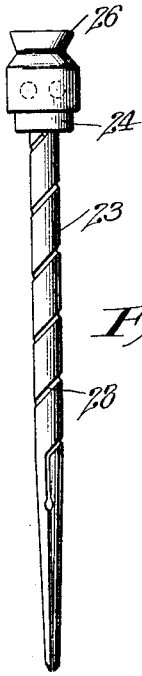
John A. Bilterman, INVENTOR
BY Victor J. Evans ATTORNEY
WITNESS:

UNITED STATES PATENT OFFICE.

JOHN A. BILTERMAN, OF ALBIA, IOWA.

NUT LOCK.

1,409,817.  Specification of Letters Patent.  Patented Mar. 14, 1922.

Application filed February 26, 1921. Serial No. 448,005.

*To all whom it may concern:*

Be it known that I, JOHN A. BILTERMAN, a citizen of the United States of America, residing at Albia, in the county of Monroe and State of Iowa, have invented new and useful Improvements in Nut Locks, of which the following is a specification.

This invention relates to nut locks, and is designed for use in conjunction with a bolt having a split expansible end portion, which is expanded by driving a key longitudinally through the bolt to prevent retrograde movement of the nut on the latter.

In carrying out the invention I associate with the key a lubricant container, the key being designed to convey the lubricant throughout the entire length of the key to facilitate association of the key with the bolt or its removal therefrom.

Another object of the invention resides in providing the expansible end of the bolt with grooves to receive the bendable terminals of the key so as to hold the key operatively associated with the bolt for the purpose specified.

The nature and advantages of the invention will be better understood when the following detail description is read in connection with the accompanying drawings, the invention residing in the combination, construction and arrangement of parts as claimed.

In the drawings forming part of this application, like numerals of reference indicate similar parts in the several views and wherein:—

Figure 4 is a detail view of the bolt partly in section.

Figure 6 is a view showing the key operatively associated with the bolt.

Figure 7 is a detail view of a modified form of key.

Figure 8 is a detail view of a modified form of key and a lubricant cup associated therewith.

Figure 1:
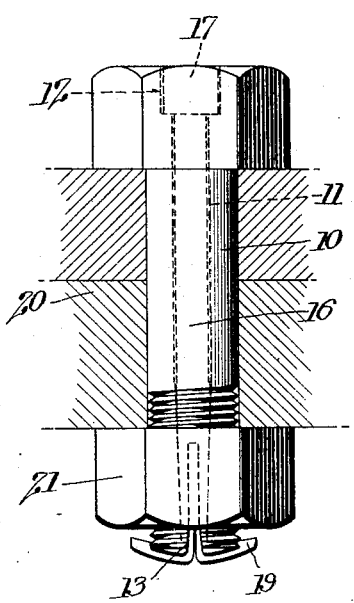
Figure 1 is a view showing a bolt and nut associated with the locking key.
Figure 3:
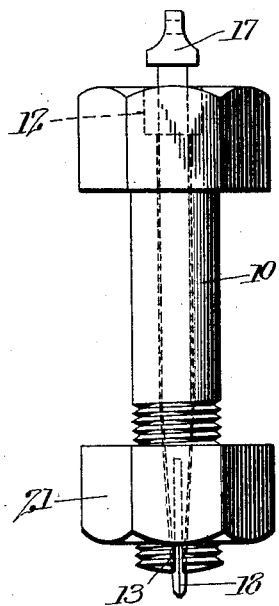
Figure 3 is a view similar to Figure 1 showing the key partly inserted within the bolt.
Figure 2:
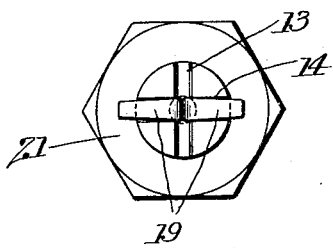
Figure 2 is an end elevation thereof.
Figure 5:
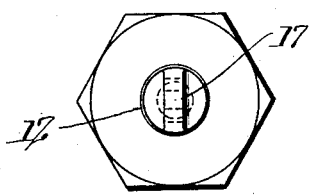
Figure 5 is an end elevation.

Referring to the drawings in detail, 10 indicates a headed bolt of usual construction except that the bolt has a longitudinal bore 11 opening at both ends of the bolt, and which bore is slightly tapered toward the threaded end thereof as shown. The head of the bolt is provided with a recess 12 which surrounds the bore 11 for a purpose to be hereinafter described. The threaded portion of the bolt is slotted as at 13 to provide an expansible end portion, while the end of the bolt is provided with a transverse groove 14 intersecting the slot 13.

Used in conjunction with a bolt of this character is a locking key 16 which is slightly longer than the bolt 10 and adapted to be passed through the bore 11 thereof. The key is provided with a head 17 which is received within the recess 12 of the bolt, while the key is slightly tapered adjacent one end to correspond to the shape or outline of the bore 11 of the bolt. The tapered end of the key is bifurcated as at 18, the separated portions 19 defined by the said bifurcation being bendable for association with the bolt in a manner to be presently described.

In practice, after the bolt has been passed through the material or object 20, the nut 21 is threaded upon the bolt in the usual manner. The locking key is then passed through the bore 11 of the bolt, and when the head of the key has been seated within the recess 12, the key has caused the slotted end of the bolt to be expanded in a manner to prevent retrograde movement of the nut on the bolt. As above stated the key is slightly longer than the bolt, the bendable portions defined by the bifurcation of the key projecting beyond the threaded end of the bolt, and subsequently bent into the transverse groove to prevent casual separation of the key and bolt as will be readily understood. The body of the key is provided with openings 22 to permit a suitable tool to be used in removing the key from the bolt when the occasion requires, the construction of the parts being such that they can be quickly and easily assembled or disassembled when necessary.

In the modified form of the invention the key 23 has its body 24 threaded as at 25 to accommodate a lubricant container or cup 26 which is interiorly threaded as at 27 for this purpose. The key is provided with a spiral groove 28 which extends throughout the major portion of the length of the key and is utilized to convey lubricant to the cup through the bore of the bolt to which it is associated for the purpose of facilitating both the insertion of the key within the bore and its removal therefrom.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. In combination, a bolt having a longitudinal bore tapered toward one end, said bolt being slotted to provide an expansible end portion, a key passed through said bolt and designed to expand said end to prevent retrograde movement of the nut on the bolt, a head formed on one end of the key, the opposite end of the key being bifurcated to provide bendable portions adapted to be associated with said bolt to hold the key and bolt operatively associated, a lubricant container carried by the head of the key, and said key having a spiral groove communicating with said container for the purpose specified.

2. In combination, a bolt having a longitudinal bore and an expansible end portion, a key passed through said bolt and designed to expand said end portion to prevent retrograde movement of a nut when the latter is associated with the bolt, a lubricant container carried by one end of the key, and said key having a spiral groove communicating with the container for the purpose specified.

3. In combination, a bolt having a longitudinal bore, said bolt being slotted at one end to provide expansible portions, one end of the bolt having a transverse groove, a key passed through the bolt and designed to expand said portions to prevent retrograde movement of a nut when the latter is associated with the bolt, one end of the key being bifurcated to provide bendable portions adapted to be arranged in the transverse groove of the bolt to hold the key and bolt operatively associated, a lubricant container carried by the key, and said key having a spiral groove communicating with the container for the purpose specified.

In testimony whereof I affix my signature.

JOHN A. BILTERMAN.